6628X
J. J. Heintzelman,
Truss.
Patented July 20, 1831.
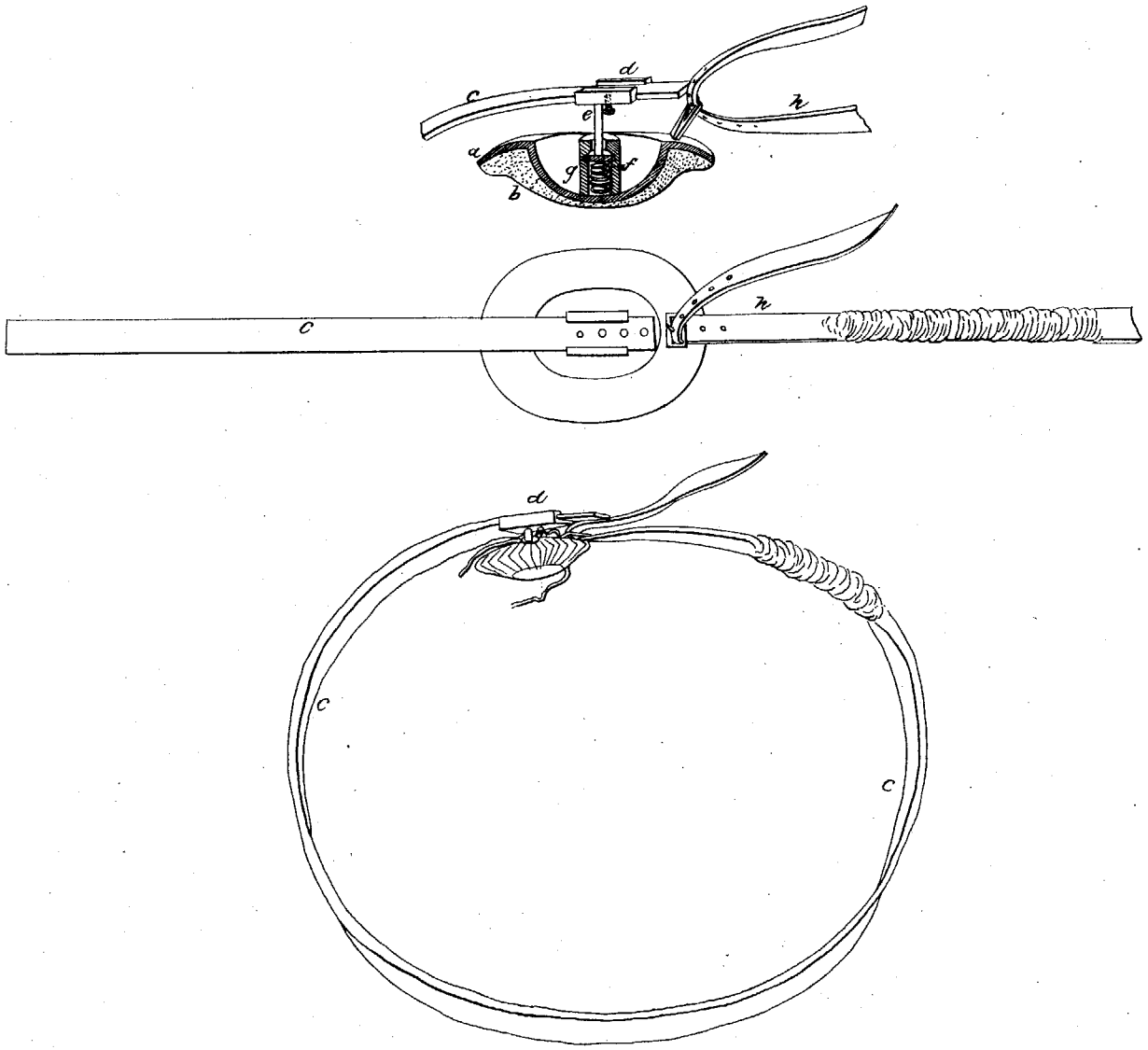
AM. PHOTO-LITHO. CO. N.Y. (OSBORNE'S PROCESS.)

July 20. 1831. 6628X

John J. Heintzelman
Letters Patent

The schedule referred to in these Letters Patent and making part of the
same containing a description in the words of the said John J. Heint
zylman himself of his improvement in the Truss called the Burn
Elastic pad Truss

---

The great deficiency hitherto experienced for the want of a good Truss
in Hernial affections when it is taken into consideration the large
proportion of mankind that are afflicted with this painful malady
has rendered an investigation of constructing a more efficacious
Truss particularly interesting and necessary for effecting a radical
cure or mitigating the distress of those afflicted from the frequent
fatality resulting from improper treatment.

Before describing my
improvement I shall briefly state a few of the many imperfections
attending the different trusses heretofore presented to the public.
On the convex pad there are undoubtedly many just objections
grounded on the true principle of surgery.

1st. They afford no support
to the muscular fibres around the aperture but on the contrary
more frequently prove injurious by destroying the natural tone
particularly in exaggerated cases where a great degree of pressure
must necessarily be applied admitting little of any elasticity or
lateral motion.

2nd. Those on the principle of being concave are
equally obfectionable in consequence of the liability of the spring
that affords the lateral motion becoming easily impaired render
ing it unfit for the necessary influence or pressure together with the
concave part of the pad not pressing immediately on the aper-
ture of the hernial sac to prevent the viscera making the slight-
est intrusion in the sac [illegible] a cure or relief by suppos
ing

[illegible] properly can be effected by agglutination -

3d and lastly. The great evil attending every truss used more particularly the pad, uncleanliness and offensive smell which naturally must ensue [illegible] the materials used for covering, so readily absorbs the perspirable matter of the body rendering it hard and inconvenient particularly during the warmer seasons of the year, By this improvement all the foregoing evils are obviated agreeably to the following specification. feeling satisfied of all the advantages happily combined in the discovery.

This improvement of the circular spring consist of a thin piece of steel about one inch broad and the length requisite for the size of the person, with two holes at the extreme end for fastening the appendages to adjust the truss on the body. On the other end there are 4 small holes 3/4 of an inch apart in a straight line for lengthening or shortening the spring as circumstances may require, when applied on the pad. After the spring is properly shaped the whole is covered with japanned silk or linnen as a preventive against the perspirable matter of the human body when worn which naturally has the tendency of destroying the elasticity & rendering it perfectly useless in a short time. 3. The pad. this is somewhat of an oval or round two and a half inches long & two & one eighth inches broad prepared of tin or any other metal, convex on the outside with an indentation (concavity) in the centre half an inch in depth & one inch & three eighths in diameter, forming on the inner side the centre convex & the surrounding plate concave on which is placed a pad of gum elastic. By this discovery if only a few of the advantages contemplated be realized it must be considered a valuable acquisition in the formation of the pad, among which we might enumerate durability, elasticity & cleanliness. the last though not the least will alone be of great importance which is unattainable in all other trusses though giving a greater consideration on surgical prin ple plate to the shape. For forming this pad the gum elastic is first pre-
pared and shaped in imitation of the oval plate or round without
the cap. on the lower side convexly with the depression in the centre
on the upper side (that one applying on the body) the convexity formed
in the centre by the concavity in the centre of the lower side is consider-
ably flattened so as to present a more even surface on the centre of
the orifice through which the viscera protrudes in Hernial affec-
tions. The edge remaining elevated leaving a concavity or depres-
sion around the convexness in the centre in which manner the low-
er side is accurately fitted to the plate already described with
some adhesive ingredient. On the external surface of the oval plate
there is a ring secured in the centre of the concavity already describ-
ed, three eighths of an inch high with a screw on the upper edge
and within a spiral spring confined by means of a screw cap two
eighths of an inch with a round hole in the centre through which
passes a brass rod five eighths of an inch in length with a small
round plate rivetted at the end resting on the spiral spring at
the other end there is a slide in order to pass through one end of
the circular spring with a small screw passing thro' the centre of
the slide & perforation in the circular spring to make it station-
ary leaving an intermediate space on said rod of three eighths
of an inch to act on the spiral spring. By this great rotary &
lateral motion afforded by the spiral spring the pad remains
permanent by being placed perfectly free from any injurious
effects or action of the circular spring to which it is subject by
the numerous positions the body is placed during the exercises of
the day. In describing the improvements for fastening the truss
around the body, I shall principally advert to the advantages
of the brass spiral wire from three to six inches long fastened in the
extreme end of the circular spring and the other on a strap of
leather about two inches in breadth & requisite length to pass
around on the pad where it is fastened by means of a stationary
buckle. The spiral wires are next covered with a piece of kid.

or muslin double the length of the wire so as not to impair the
elasticity, being of great importance for ease & comfort yielding
readily to the different positions of the body The whole of
circular spring including the wire appendages are now cover
with buck skin or silk previously lined and fastened at the
other end of the circular spring. The pad is now covered sepa
rately with a silk or velvet case drawn with a ribbon and tied on
the back of the pad. Having now finished the whole truss you
place the end of the circular spring already described through
slide on the back of the pad and fasten the same by passing the
small screw thro' the centre of the slide & hole in the circular spri
By this mode it can be lengthened or shortened as the case m
require. By this new improved Gum Elastic Pad Lug
Solanis agreeably to specification the formation of the improv
Gum Elastic Pad for said purpose. Together with the spiral
spring and all other springs confined with a screw cap on the
back of the oval or round plate prepared from any of the dif
ferent metals with a small brass rod passing through the
centre with a slide on the top and a small plate at the oth
end resting on any spring fastening the japanned or tinned
circular spring thereon by which the rotary & lateral motion is
derived from said brass rod acting on the spiral spring. Also t
right of the elastic appendages for fastening all trusses on the
body by means of spiral wires all of which I find to answer per
fectly well Witnesses
John J. Heintzelman Ex^d Geo F. Goodman
N.G Jno Goodman

[1830 w 75]